United States Patent
Mehetre et al.

(10) Patent No.: US 8,959,467 B2
(45) Date of Patent: Feb. 17, 2015

(54) STRUCTURAL RULE ANALYSIS WITH TCL SCRIPTS IN SYNTHESIS OR STA TOOLS AND INTEGRATED CIRCUIT DESIGN TOOLS

(71) Applicant: LSI Corporation, Milpitas, CA (US)

(72) Inventors: Balram Nana Mehetre, Pune (IN); Douglas J. Saxon, Colorado Springs, CO (US)

(73) Assignee: LSI Corporation, San Jose, CA (US)

( * ) Notice: Subject to any disclaimer, the term of this patent is extended or adjusted under 35 U.S.C. 154(b) by 50 days.

(21) Appl. No.: 13/671,070

(22) Filed: Nov. 7, 2012

(65) Prior Publication Data

US 2014/0130000 A1   May 8, 2014

(51) Int. Cl.
*G06F 9/455* (2006.01)
*G06F 17/50* (2006.01)

(52) U.S. Cl.
CPC ........ *G06F 17/5031* (2013.01); *G06F 2217/84* (2013.01)
USPC ............ 716/108; 716/106; 716/109; 716/113

(58) Field of Classification Search
CPC ............ G06F 17/5031; G06F 17/5045; G06F 2217/84; G06F 17/505; G06F 17/5022; G06F 17/5072; G06F 2217/62; G06F 17/5059
USPC .................................................. 716/106–115
See application file for complete search history.

(56) References Cited

U.S. PATENT DOCUMENTS

| | | | |
|---|---|---|---|
| 6,289,491 B1* | 9/2001 | Dupenloup | 716/106 |
| 6,532,577 B1* | 3/2003 | Mbouombouo et al. | 716/103 |
| 6,701,506 B1* | 3/2004 | Srinivasan et al. | 716/114 |
| 7,000,206 B2* | 2/2006 | Kidd et al. | 716/108 |
| 7,281,230 B2* | 10/2007 | Chung et al. | 716/114 |
| 7,490,307 B2 | 2/2009 | Fomaciari et al. | |
| 7,512,919 B2* | 3/2009 | Visweswariah | 716/113 |
| 7,571,405 B1* | 8/2009 | Aik | 716/107 |
| 7,886,246 B2* | 2/2011 | Buck et al. | 716/108 |
| 8,127,264 B2* | 2/2012 | Parker et al. | 716/136 |
| 8,141,015 B1* | 3/2012 | Govig et al. | 716/108 |
| 2003/0188268 A1* | 10/2003 | Konstadinidis et al. | 716/2 |
| 2004/0049745 A1* | 3/2004 | Rahman et al. | 716/4 |
| 2004/0068711 A1* | 4/2004 | Gupta et al. | 716/18 |
| 2004/0111686 A1* | 6/2004 | Chang et al. | 716/6 |
| 2004/0221249 A1* | 11/2004 | Lahner et al. | 716/4 |
| 2005/0268258 A1* | 12/2005 | Decker | 716/4 |
| 2006/0026546 A1* | 2/2006 | Dinter et al. | 716/11 |
| 2006/0101363 A1* | 5/2006 | Fry et al. | 716/6 |
| 2007/0079266 A1* | 4/2007 | Devineni et al. | 716/5 |
| 2007/0083839 A1* | 4/2007 | Lahner et al. | 716/11 |
| 2007/0089074 A1* | 4/2007 | Ramachandran et al. | 716/2 |
| 2008/0040698 A1* | 2/2008 | Ferrari et al. | 716/6 |

* cited by examiner

*Primary Examiner* — Nha Nguyen
(74) *Attorney, Agent, or Firm* — Suiter Swantz pc llo

(57) ABSTRACT

A method of designing a circuit, an apparatus and a structural analysis tool are disclosed. In one embodiment, the structural analysis tool includes: (1) a structural analyzer configured to apply a structural rule to the circuit design in a design environment of said design process having valid timing data and (2) a structural assessor configured to generate structural data of the circuit design based on application of the structural rule by the structural analyzer.

13 Claims, 1 Drawing Sheet

STRUCTURAL RULE ANALYSIS WITH TCL SCRIPTS IN SYNTHESIS OR STA TOOLS AND INTEGRATED CIRCUIT DESIGN TOOLS

TECHNICAL FIELD

This disclosure relates to, in general, designing circuits and, more specifically, to structural analysis of a circuit design.

BACKGROUND

Circuit designers use electronic design automation (EDA) tools, a category of computer aided design (CAD) tools, to create a functional circuit design, including a register transfer level (RTL) representation of the functional circuit design, synthesize a "netlist" from the RTL representation, and implement a layout from the netlists. Synthesis of the netlist and implementation of the layout involve simulating the operation of the circuit and determining where cells should be placed and where interconnects that couple the cells together should be routed. EDA tools allow designers to construct a circuit, simulate its performance, estimate its power consumption and area and predict its yield using a computer and without requiring the costly and lengthy process of fabrication.

The design of a circuit has two major stages: functional design and structural framework. The functional design of a circuit, such as an Application Specific Integrated Circuit (ASIC), is typically performed by a design team that provides the specification, architecture, RTL and design verification. The structural framework of the circuit design is typically performed by a design implementation team that oversees logic connectivity, partitioning and floorplanning of the circuit design. Additionally, the structural framework of a circuit design is analyzed and corrected during the design process to ensure that the design withstands all of the desired physical implementations aspects until the final design stage. The quality of a circuit design netlist is typically analyzed based on different structural rules to identify design problems with respect to physical implementation and before being sent to the physical implementation team.

A structural analysis tool, a type of EDA tool, is often used to analyze a netlist before the handoff to the physical implementation team. Structural analysis tools, such as a netlist audit tool, can be used to identify physical implementation design problems. These netlist audit tools, however, require new tool setup and generate large reports and logs that are difficult to analyze and cumbersome to filter the waivers and noncritical violations according to design constraints (e.g., timing constraints). Due to the volume of generated reports, real violations can be masked due to the sheer size of the reports. As such, design teams can have difficulty in identifying real issues because of the size of reports that included waivable, noncritical violations also. Additionally, creating a new tool setup to analyze the design typically requires different file formats to be created and read in specific rule templates. Furthermore, in some cases rule specific parameters need to be defined and relevant side files created when running specific templates.

SUMMARY

In one aspect, a structural analysis tool for analyzing a structural framework of a circuit design during a design process is disclosed. In one embodiment, the structural analysis tool includes: (1) a structural analyzer configured to apply a structural rule to the circuit design in a design environment of the design process having valid timing data and (2) a structural assessor configured to generate structural data of the circuit design based on application of the structural rule by the structural analyzer.

In another aspect, a method of designing a circuit is disclosed. In one embodiment, the method includes: (1) applying at least one structural rule to a circuit design in a design environment that has valid timing data and (2) generating structural data of the circuit design based on the applying the at least one structural rule, wherein the applying is carried out by a processor.

In yet another aspect, an apparatus is disclosed. In one embodiment, the apparatus includes: (1) circuitry for applying at least one structural rule to a circuit design having valid timing data and (2) circuitry for generating structural data of the circuit design based on the applying the at least one structural rule, wherein the applying and the generating employ tool command language scripts.

BRIEF DESCRIPTION OF THE DRAWINGS

For a more complete understanding of the disclosure, reference is now made to the following descriptions taken in conjunction with the accompanying drawings, in which.

DETAILED DESCRIPTION

Figure 1:
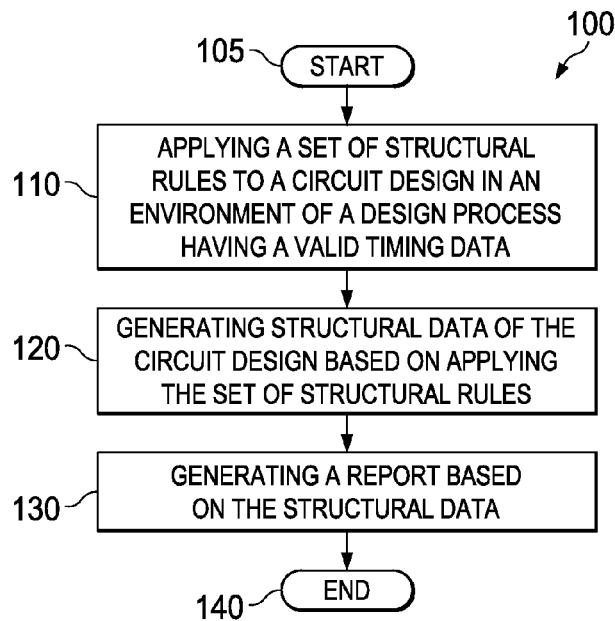
FIG. 1 illustrates a flow diagram of an embodiment of a method for designing a circuit carried out according to the principles of the disclosure.

The disclosure provides an improved structural analysis tool and method that operates (or runs) within a design environment having valid timing data. In one embodiment, the structural analysis tool or method operates within a synthesis or a pre-layout static timing analysis (STA) environment of a design process. As such, the disclosure provides a structural analysis scheme that correlates to actual timing data of a circuit design. Thus, the disclosed structural analysis scheme takes advantage of report filtering that has automatically been done since timing exceptions (e.g., false paths (FP) and multicycle paths (MCP)) are already applied and clocks are defined. Additionally, the disclosed structural analysis scheme does not require setting-up a new tool for analysis. Instead, the structural analysis scheme can be employed within the same synthesis or STA tool that is used during the design process of a circuit.

The disclosed structural analysis scheme applies structural rules for the circuit design, such as an integrated circuit design. In some embodiments, tool code language (TCL) scripts are used within the particular EDA tools, such as synthesis or STA tools, to cover the particular structural rules that are targeted. "Cover" as used herein is defined as representing for determining compliance. Examples of structural rules that are addressed include fanin cone, fanout cone, logic levels in path, registered input/output (IO) analysis and Vt distribution. The structural rules can be based on industry standard structural rules or be proprietary rules. A manufacturer, for example, can establish a structural rule or set of rules that provide guidance during the design process to improve the physical implementation of the circuit design.

The structural data extracted through the disclosed structural analysis scheme assists in identifying and prioritizing structural violations for the design team to review. This allows the design team to more efficiently provide a structurally analyzed and corrected design to a design implementation team. Accordingly, the disclosed scheme can reduce the amount of unnecessary information exchanged between a design team and a design implementation team to assist in reducing long iterations in the design process and providing faster design closure. For example, the disclosed structural analysis scheme can provide meaningful violations (or only meaningful violations) to the design team allowing a reduced turnaround time (e.g., for RTL changes) and improved efficiency in the design process.

As noted above, the disclosed structural analysis scheme is implemented in a design environment having valid timing data, such as a synthesis or pre-layout STA environment of a design process. Several advantages are therefore provided by the disclosed scheme compared to conventional structural analysis tools. For example, considering TCL script based structural analysis disclosed herein for the above noted examples of structural rules, the TCL scripts are applied against a database having valid timing data that provides a first and major layer of filtering since the critical paths of the circuit design are now known and can be cross-referenced against the structural data. Frequency based thresholds can also be set to find out critical violations (e.g. frequency based logic level thresholds). Additionally, in a valid timing data environment such as a synthesis or STA environment, constraints, exceptions (e.g., FP, MCP, clocks) have already been reviewed by the design team. As such, a synthesis or STA database already has constraints built in for the structural analysis.

The structural analysis TCL scripts can also provide logic level analysis based on a finite number of worst paths in each clock group of the circuit design and structural violations can be reported relative to clock period. Additionally, fanin and fanout analysis can be done for all or at least substantially all of the registers in the circuit design.

The TCL script based structural analysis disclosed herein makes use of timing constraints, exceptions and attributes to make more intelligent judgments in the design process. For example, unregistered input/output interfaces that are a false path for timing are labeled as such.

Thus, in contrast to conventional structural analysis, major report filtering activity is not needed because the constraints inherent in the design environments having valid timing data automatically reduce the size of structural violation reports because of FP, MCP and slower clock definitions. Accordingly, non-timing critical logic (e.g., FP, MCP, slower clock domains) can automatically receive a lower priority and be easily filtered without manual analysis.

FIG. 1 illustrates a flow diagram of an embodiment of a method 100 for designing a circuit (e.g. an IC) carried out according to the principles of the disclosure. The method 100 includes carrying out a structural analysis of the circuit design employing an EDA tool having valid timing data for the circuit design. In some embodiments, this includes employing an EDA tool that is used for synthesis of the circuit design or static timing analysis of the circuit design. As such, the same EDA tool that is used for synthesizing or validating timing data of the circuit design can be employed to perform each step of the method 100. In one embodiment, TCL scripts of the specific EDA tool are used to perform the method 100.

The EDA tools can be commercially available tools that are commonly used for synthesizing or validating timing data during the design process and have been modified to perform functions disclosed herein. In some embodiments, proprietary EDA tools may be used. An EDA tool can include the necessary logic circuitry to carry out the method 100. In one embodiment, the method 100 may be embodied as a series of operating instructions that are stored on a computer readable medium and used to direct the operation of a processor when initiated thereby. The method 100 begins in a step 105.

Figure 2:
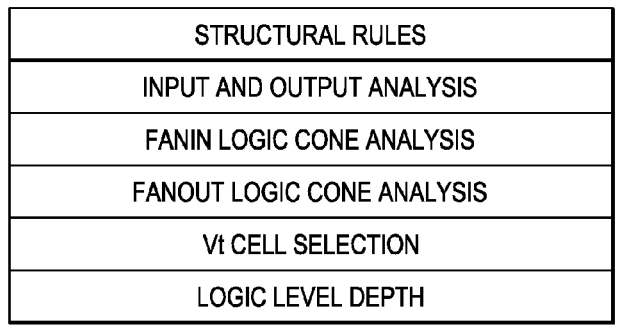
FIG. 2 illustrates TABLE 1 that provides an example of structural rules that are applied during a design process carried out according to the principles of the disclosure.

In a step 110, a set of structural rules are applied to a circuit design having valid timing data. For example, the structural rules are applied in a synthesis or a STA environment, such as a pre-layout STA environment, of a design process. In one embodiment, a single structural rule is applied. The structural rules can be applied by using TCL scripts. As such, in some embodiments applying the set of structural rules is performed by TCL scripts against a synthesis or STA database, of the circuit design. In some embodiments, the TCL scripts cover structural rules that have been developed according to industry standards or by proprietary EDA tools. The structural rules provide guidelines for the physical implementation of the circuit design. Table 1 illustrated in FIG. 2 provides an example of structural rules employed in an embodiment disclosed herein.

In Table 1, the structural rules are for input/output analysis, fanin and fanout logic cone analysis, Vt cell selection and logic level depth. In one embodiment of the method 100, application is limited to only these four structural rules.

Structural data of the circuit design is generated based on applying the set of structural rules in a step 120. The structural data is the results or answers from the circuit design (or database of the circuit design) in response to the application of the structural rules.

In a step 130, a report based on the structural data is generated. In one embodiment, at least a portion of the report that is generated is provided in a searchable format. For example, in one embodiment at least some of the structural data is formatted for Excel® by Microsoft® of Redmond, Wash., that allows searching according to different parameters. Other searchable spreadsheets or word processing programs can also be used.

The structural data and the report or reports that are generated correspond to the selected structural rules. Following are examples of the structural data that is generated based on the four structural rules discussed above. For the input/output analysis, the method 100 generates reports showing how well the interfaces of the circuit design are registered. Each input/output pin of a circuit design's blocks is analyzed to determine whether a pin is registered. If not registered, a designer can perform additional analysis to determine why not registered, such as if a particular pin is waived or classified as unregistered. A registered pin corresponds to the start point and the end point of a data path. A designer can look at the results of the input/output analysis of a block and either change the design, waive or recognize to leave the same.

In one embodiment, each unregistered input/output interface is placed into an appropriate category describing its logical structure such as an output register feeding back into core, output register feeding multiple output ports, registered input port also feeding direct output port, input port directly feeding a hard memory, etc.

In one embodiment, the method 100 generates reports for unregistered ports that provide details of the size of their logic cones for further analysis by, for example, the design team. Additionally, various reasons for waived input/output interfaces, such as special analog or custom signals that require special care or manual implementation, internal debug buffers in chips, clocks, false paths, unused or constant signals, unregistered signals due to protocol etc., can be listed in a generated report corresponding to structural analysis. What is to be waived or not waived is typically determined by the design team based on, for example, if a signal of the circuit design needs to be implemented with timing constraint or timing requirements.

For logic level depth analysis of the circuit design, logic levels (i.e., length of logic clouds or logic paths) are noted to alert the design team of potential timing problems. In one embodiment the method 100 reports logic levels above a particular threshold from a determined number of paths in each clock group or with slack less than a determined percentage of clock periods in each clock group of the circuit design. The threshold, number of paths and percentage can be selected by, for example, a designer of the circuit and may be dependent on the type of circuit design, historical data, technology node and frequency. In one embodiment, the number of paths is five thousand and the slack percentage is twenty five percent. The selected values depend on overall methodology guidelines; for example, the 25% is to include the paths with less margin which are more likely to have a timing violation. These values for the number of paths and the slack percentage can be default values that a designer can change in, for example, TCL scripts used to cover the structural rules.

For logic level depth analysis, the method 100 can also accept a waiver file with clocks and/or start point/end point pairs. A start point of the circuit is the launch element, such as a flip-flop or a memory, for a signal (where transition of a signal starts) of the circuit. The end point of the circuit is the capture element, such as a flip-flop, of the signal (where the signal is captured). Lines or portions from the generated report can be copied to the waiver file. In one embodiment, TCL scripts for logic level depth analysis reduce the logic level threshold if the start point is memory. The TCL scripts can also determine the number of repeater buffer pairs in the timing path. The repeater buffer pairs are placed in signal paths of the circuit to repeat the signal over long distances. Repeater buffers can provide a possible indication of placement/connectivity issues and therefore provide an alert to the design team or implementation team.

In some embodiments, the method 100 also provides display slack, effective clock period and if the start point is a memory. "High delay cell" count can also reported in a text format so that the report can be sorted on different parameters such as worst logic levels, slack, etc., when reported in a searchable format. A threshold number for noting a high delay cell count can be established by the design team based on historical data, type of circuit design, etc. Large macro blocks, such as a memory, as a start point or an end point are also considered in the structural analysis due to the size of the block (i.e., large footprint) with respect to the area of the circuit design.

Fanin (associated with the start point) and fanout (associated with the end point) analysis identifies or flags implementation challenges due to, for example, physical space or footprint problems. The fanin and fanout analysis allow the design team to break-up a logic cloud to provide flexibility for the implementation team. As such, implementation problems can be recognized early to reduce the number of iterations needed for design implementation.

For fanin logic cone analysis, in one embodiment the method 100 reports fanin cones above a determined number (i.e., a large fanin cone) from all of the registers in the circuit design. In one embodiment, the determined number is two thousand. A waiver file with clocks and/or end points can also be generated. Portions of or lines from a generated report can be copied to the waiver file for future fanin logic cone analysis (i.e., additional iterations). In one embodiment, the generated report includes effective clock period, slack, and if a large macro block is in a fanin cone. As such, sorting on different parameters is possible if the report is copied or provided in a searchable format.

For fanout logic cone analysis, the method 100 can report fanout cones above a determined number (i.e., a large fanout cone) from all registers of the circuit design. In one embodiment, the determined number is five thousand. A waiver file with either clocks and/or start points can be generated. Reports generated for the fanout analysis can include the effective clock period, slack and large macros in a fanout cone. The reports or report can be generated in a text report which enables sorting on different parameters when reported or copied to a searchable format. Lines or portion from the generated report can be copied to the waiver file.

For Vt spread analysis of the circuit design, the method 100 generates a report percentage of different type of Vt cells such as standard Vt, low Vt, high Vt cells, performance library cells or density library cells in the circuit design. This provides the design team with information that can be used to improve the circuit design by, for example, reducing power consumption.

The various reports generated based on the structural analysis can provide the registered input/output pins, and a waiver file of the logic level depth based on determined cell delays and a determined number of worst paths in each clock group of the circuit design. In one embodiment, the average cell delay of 100 ps, a memory cell delay of 500 ps, and the number of worst paths analyzed in each clock group is 5000. For the fanin and fanout analysis, waiver files can be generated. For Vt analysis, a VT spread report can be provided.

After step 130, the method 100 then ends in a step 140.

Figure 3:
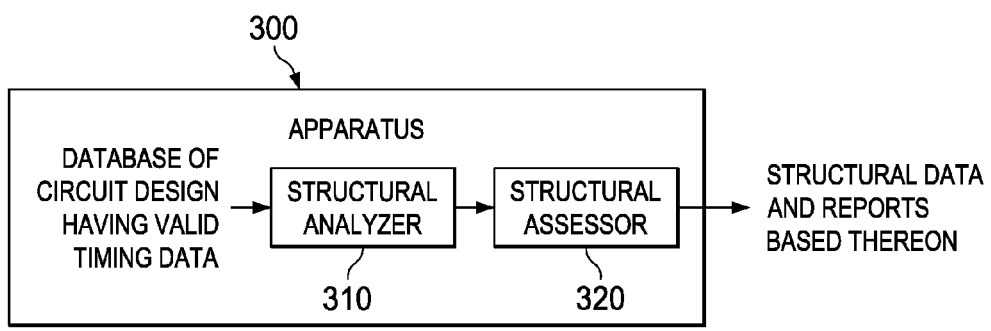
FIG. 3 illustrates a block diagram of an embodiment of an apparatus constructed according to the principles of the disclosure.

FIG. 3 is a block diagram of an embodiment of an apparatus 300 constructed according to the principles of the present disclosure. To perform the described functions, the apparatus 300 may be embodied as a series of operating instruction stored on a computer-readable medium that directs the operation of a processor when initiated thereby. In one embodiment, the apparatus 300 may be a dedicated computing device including the necessary circuitry (including a processor and memory) or software to perform the described functions. The apparatus 300 may be an EDA tool. In some embodiments, the apparatus 300 or parts of the apparatus may be a proprietary EDA tool. In one embodiment, the apparatus 300 is an EDA tool used for synthesizing a circuit design. In another embodiment, the apparatus is an EDA tool used to perform static timing analysis of the circuit design. With either the synthesis or STA tool, structural analysis is advantageously performed in the same environment upon which the design is created. The apparatus 300 includes a structural analyzer 310 and a structural assessor 320. In one embodiment, TCL scripts of an EDA tool are employed to implement the apparatus 300.

The structural analyzer 310 is configured to apply a structural rule or set of structural rules to a circuit design in a valid timing environment employed during the design process for the circuit design. In some embodiments, a synthesis or pre-layout database is used. The structural analyzer 310, therefore, can use an internal database generated by the apparatus 300 itself during the design process. In one embodiment, TCL scripts are run on the particular database. Since structural information is already in the synthesis or pre-layout STA environment, there is no need to correlate between two different EDA tools to perform structural analysis. Design Compiler® and Primetime® from Synopsis® are examples of two EDA tools that operate in the synthesis or pre-layout environment, respectively The structural assessor 320 is coupled to the structural analyzer 310 and is configured to generate structural data of the circuit design based on application of the set of structural rules by the structural analyzer. The structural assessor 320 is also configured to generate reports based on the structural data. The reports can be generated in a searchable format. In one embodiment, the structural assessor 320 is configured to generate waiver files for different structural rules based on the structural data. The apparatus 300 can be used for multiple iterations of structural analysis based on the structural data and reports.

The above-described apparatuses and methods may be embodied in or performed by various conventional digital data processors or computers, wherein the computers are programmed or store executable programs of sequences of software instructions to perform one or more of the steps of the methods, e.g., steps of the method of FIG. 1. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method of FIG. 1, or functions of the apparatuses described herein. Additionally, an apparatus, such as an EDA tool, may be designed to include the necessary circuitry to perform each step of the method of FIG. 1. As disclosed herein, in some embodiments the EDA tool is a synthesis tool or a static timing analysis tool. A synthesis or STA tool can include the operating instructions, circuitry or combination thereof for performing the methods described herein. As such, the disclosed methods can employ valid timing data.

Certain embodiments of the invention further relate to computer storage products with a non-transitory computer-readable medium that have program code thereon for performing various computer-implemented operations that embody the tools or carry out the steps of the methods set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which the invention relates will appreciate that other and further additions, deletions, substitutions and modifications may be made to the described embodiments without departing from the scope of the invention.

What is claimed is:

1. A structural analysis tool for analyzing a structural framework of a circuit design during a design process implemented as a series of operating instructions stored on a non-transitory computer readable medium that direct the operation of a processor when initiated, said tool comprising:
   a structural analyzer configured to apply at least two structural rules to said circuit design in a synthesis or a pre-layout static timing analysis environment of said design process having valid timing data, wherein non-timing critical logic automatically receive lower priority, said structural rules including at least two of registered input/output analysis, fanin and fanout logic cone analysis, Vt (threshold voltage) spread analysis, and logic level depth analysis; and
   a structural assessor configured to generate structural data of said circuit design based on application of said structural rule by said structural analyzer;
   wherein said structural analysis tool is implemented as a set of tool command language (TCL) scripts of a synthesis or static timing analysis EDA (electronic design automation) tool; and
   wherein and said structural data identifies at least one of a percentage of standard Vt cells, a percentage of low Vt cells, a percentage of high Vt cells, a percentage of performance library cells, and a percentage of density library cells in said circuit design.

2. The structural analysis tool as recited in claim 1 wherein said structural rule is for registered input/output analysis and said structural data indicates how well interfaces of said circuit design are registered.

3. The structural analysis tool as recited in claim 1 wherein said structural rule is for logic level depth and said structural data indicates logic levels of cells in said circuit design that are above a determined threshold from a particular number of paths in each clock group thereof.

4. The structural analysis tool as recited in claim 1 wherein said structural data identifies the number of buffers and/or inverters in a timing path of said circuit design.

5. The structural analysis tool as recited in claim 1 wherein said structural rule is for logic level depth and said structural data indicates slack, effective clock period, if a start point is a memory, and high delay cell count of circuit design.

6. The structural analysis tool as recited in claim 1 wherein structural rule is for fanin and fanout logic cone and said structural data identifies effective clock period and slack of said circuit design in a searchable format.

7. The structural analysis tool as recited in claim 1 wherein said logic level depth analysis includes at least one of a report of logic levels above a threshold from at least one path of a clock group, a report of logic levels of slack below a threshold in each clock group of the circuit design, and a waiver file with at least one of clocks and start point/end point pairs.

8. A method of designing a circuit, comprising:
   applying at least two structural rules to a circuit design in a synthesis or pre-layout static timing analysis environment that has valid timing data, wherein non-timing critical logic automatically receive lower priority, said structural rules including at two of registered input/output analysis, fanin and fanout logic cone analysis, Vt (threshold voltage) spread analysis, and logic level depth analysis; and
   generating structural data of said circuit design based on said applying said at least two structural rules, wherein said applying is carried out by a processor;
   wherein said applying and said generating are performed by tool command language (TCL) scripts of a synthesis or static timing analysis EDA (electronic design automation) tool; and
   wherein said structural data identifies at least one of a percentage of standard Vt cells, a percentage of low Vt cells, a percentage of high Vt cells, a percentage of performance library cells, and a percentage of density library cells in said circuit design.

9. The method as recited in claim 8 wherein said structural rule is based on industry standard structural rules.

10. The method as recited in claim 8 further comprising generating a report of said structural data wherein at least a portion of said report is in a searchable format.

11. The method as recited in claim 8 wherein said applying is performed by tool command language scripts against a synthesis or static timing analysis database of said circuit design.

12. An apparatus, comprising:
a processor being adapted to perform the steps of:
applying at least two structure rules to a circuit design in a synthesis or pre-layout static timing analysis environment having valid timing data, wherein non-timing critical logic automatically receive lower priority, said structural rules including at least two of registered input/output analysis, fanin and fanout logic cone analysis, Vt (threshold voltage) spread analysis, and logic level depth analysis; and
generating structural data of said circuit design based on said applying said at least two structural rules, wherein said applying and said generating employ tool command language scripts of a synthesis or static timing analysis EDA (electronic design automation) tool;
wherein and said structural data identifies at least one of a percentage of standard Vt cells, a percentage of low Vt cells, a percentage of high Vt cells, a percentage of performance library cells, and a percentage of density library cells in said circuit design.

13. The apparatus as recited in claim 12 wherein said structural rule is a proprietary structural rule.

\* \* \* \* \*